United States Patent
Gumpl et al.

(10) Patent No.: US 7,927,048 B2
(45) Date of Patent: Apr. 19, 2011

(54) DEVICE AND METHOD FOR MACHINING GEAR WHEELS IN AN INDEXING METHOD WITH A REDUCED INDEXING TIME

(75) Inventors: Jürgen Gumpl, Ettlingen (DE); Roland Dutschk, Dresden (DE); Roger Kirsch, Karlsbad (DE)

(73) Assignee: Klingelnberg GmbH, Hückeswagen (DE)

( * ) Notice: Subject to any disclaimer, the term of this patent is extended or adjusted under 35 U.S.C. 154(b) by 981 days.

(21) Appl. No.: 11/663,712

(22) PCT Filed: Sep. 25, 2004

(86) PCT No.: PCT/EP2004/010791
§ 371 (c)(1),
(2), (4) Date: May 7, 2007

(87) PCT Pub. No.: WO2006/032296
PCT Pub. Date: Mar. 30, 2006

(65) Prior Publication Data
US 2007/0292224 A1 Dec. 20, 2007

(51) Int. Cl.
*B23F 23/00* (2006.01)
(52) U.S. Cl. .......... 409/26; 409/2; 409/27; 409/51; 409/57; 451/5; 451/11; 451/47; 451/253
(58) Field of Classification Search .......... 409/2, 26–27, 409/38–39, 42–43, 46, 50, 51, 57, 61; 451/5, 451/11, 47, 253
See application file for complete search history.

(56) References Cited

U.S. PATENT DOCUMENTS

| 3,534,655 | A | | 10/1970 | Hunkeler | |
|---|---|---|---|---|---|
| 4,981,402 | A | * | 1/1991 | Krenzer et al. | 409/26 |
| 5,116,173 | A | * | 5/1992 | Goldrich | 409/13 |
| 5,800,103 | A | | 9/1998 | Stadtfeld et al. | |
| 6,712,566 | B2 | * | 3/2004 | Stadtfeld et al. | 409/26 |
| 2006/0002775 | A1 | * | 1/2006 | Fong et al. | 409/27 |
| 2009/0068927 | A1 | * | 3/2009 | Durr | 451/5 |

FOREIGN PATENT DOCUMENTS

GB 972365 10/1964

* cited by examiner

*Primary Examiner* — Erica E Cadugan
(74) *Attorney, Agent, or Firm* — McCormick, Paulding & Huber LLP

(57) ABSTRACT

The invention relates to a device (20) comprising a workpiece spindle (21) for receiving a gear wheel (25), a tool spindle (29) for receiving a tool and several drives (X, Y, Z, B, C, A1) for machining the gear wheel in individual divisions. According to the invention, one tooth gap of the gear wheel is machined and then the tool is displaced in relation to the gear wheel in order to remove the tool from the tooth gap. The gear wheel is then rotated by a division and the tool is placed against the wheel again to machine another tooth gap. One of the drives (C) can be controlled in such a way that the relative displacement involves a tilting displacement, which modifies the relative angle between the tool and the gear wheel, the tilting displacement being co-ordinated with the displacement of a division.

5 Claims, 4 Drawing Sheets

DEVICE AND METHOD FOR MACHINING GEAR WHEELS IN AN INDEXING METHOD WITH A REDUCED INDEXING TIME

CROSS REFERENCE TO RELATED APPLICATION

This application claims the benefit of PCT Application No. PCT/EP2004/ 010791, filed Sep. 25, 2004, the disclosure of which is herein incorporated by reference in its entirety.

The invention relates to devices for machining gear wheels in an indexing method and to methods for the indexing machining of gear wheels.

BACKGROUND OF THE INVENTION

There are various devices, such as for example gear milling machines or gear grinding machines, which are configured specifically for the machining of gear wheels. As the very names of these machines suggest, the first type of machine operates with milling tools and the second type of machine with grinding tools.

One basically draws a distinction between machines which operate in an indexing method and machines which operate continuously. In the indexing method, there is machined a tooth gap, then there is carried out a movement of relative displacement to extract the tool from a tooth gap and what is known as an indexing movement (indexing rotation), in which the gear wheel rotates relative to the tool before the subsequent tooth gap is then machined. A gear wheel is thus manufactured step by step or gap by gap. A gear cutting machine 10, as indicated in FIG. 1, which operates in an indexing method, is typically provided with an indexing apparatus which rotates the workpiece 15 with teeth 16 by one or more pitches about the workpiece axis 12 at the moment at which the tool 13 is disengaged. In order to ensure that the tool 13 (in the present case, a grinding wheel indicated schematically in FIG. 1) is disengaged, there is carried out a relative movement in which the tool 13 is moved out of the tooth gap parallel to the tool axis 14 (parallel to the x-axis). If the 14 (parallel to the x-axis). If the tooth 16 has a tooth depth H, the tool 13 has to be moved by a distance HA to ensure that the tool 13 and one of the teeth 15 do not collide when the indexing rotation is carried out.

The individual movement sequences in machines 10 of this type are mechanically coordinated with one another and use is made of drives which transmit motor rotations, using worm gears and other means, to the workpiece 15 to be machined and the tool 13.

In more modern machines, a CNC control is employed instead of the indexing apparatus, which is configured to allow all the indexing movement to be carried out at the appropriate moment. Modern CNC machines typically use what are known as direct drives.

The continuous method, also sometimes referred to as the continuous indexing method, is based on relatively complex movement sequences in which the tool and the workpiece to be machined carry out a continuous indexing movement relative to each other. The indexing movement results from the coordinated driving of a plurality of axle drives.

The indexing method has the drawback that it is slower that the continuous method. Nowadays, in the industrial manufacture of larger batches, particular importance is attached to the time required for carrying out the indexing movement. In the manufacture of a gear wheel with n=20 teeth, n=20 tooth gaps have to be machined individually and n−1=19 indexing movements are required. If each indexing movement is reckoned to take 1 second, the indexing process alone takes approx. 19 seconds.

The object of the invention is therefore to provide an approach allowing the indexing method to be sped up.

The object is achieved by a device according to the present invention.

According to the invention, this object is achieved in that use is made of a device which is equipped with a workpiece spindle for receiving a gear wheel, a tool spindle for receiving a tool and with a plurality of drives for machining the gear wheel in an indexing process. In this indexing process, a tooth gap in the gear wheel is machined, then the tool is moved relative to the gear wheel to remove the tool from the tooth gap, then the gear wheel carries out an indexing rotation and the tool is advanced to machine a further tooth gap. According to the invention, one of the drives is activated via a control means in such a way that the relative movement includes a tilting movement by means of which a relative change of angle between the tool and the gear wheel is achieved, the tilting movement being coordinated with the indexing rotation.

According to the invention, this object was achieved in that for machining a gear wheel, use is made of a specific device comprising a workpiece spindle for receiving the gear wheel, a tool spindle for receiving a tool and a plurality of drives for machining the gear wheel using the tool. The device carries out the following steps:
  machining a tooth gap in the gear wheel using the tool by carrying out a machining movement,
  carrying out a relative movement between the tool and the workpiece to remove the tool from the tooth gap,
  carrying out an indexing rotation to transfer the gear wheel into a different angular position,
  machining a further tooth gap in the gear wheel using the tool by repeated carrying out of a machining movement.

According to the invention, the relative movement includes in this case a tilting movement which changes the relative angle between the tool and the gear wheel.

Further advantageous embodiments may be inferred from the dependent claims.

BRIEF DESCRIPTION OF THE DRAWINGS

Embodiments of the invention be described hereinafter in greater detail with reference to the drawings.

DESCRIPTION OF THE PREFERRED EMBODIMENTS

The present description uses concepts also used in relevant publications and patents. It should, however, be noted that the use of these concepts is intended merely for improved understanding. The specific choice of the terms is not intended to restrict the interpretation of the inventive idea and the scope of protection of the claims. The invention can readily be transferred to other conceptual systems and/or specialist fields. In other specialist fields, the concepts are to be used analogously.

Figure 1:
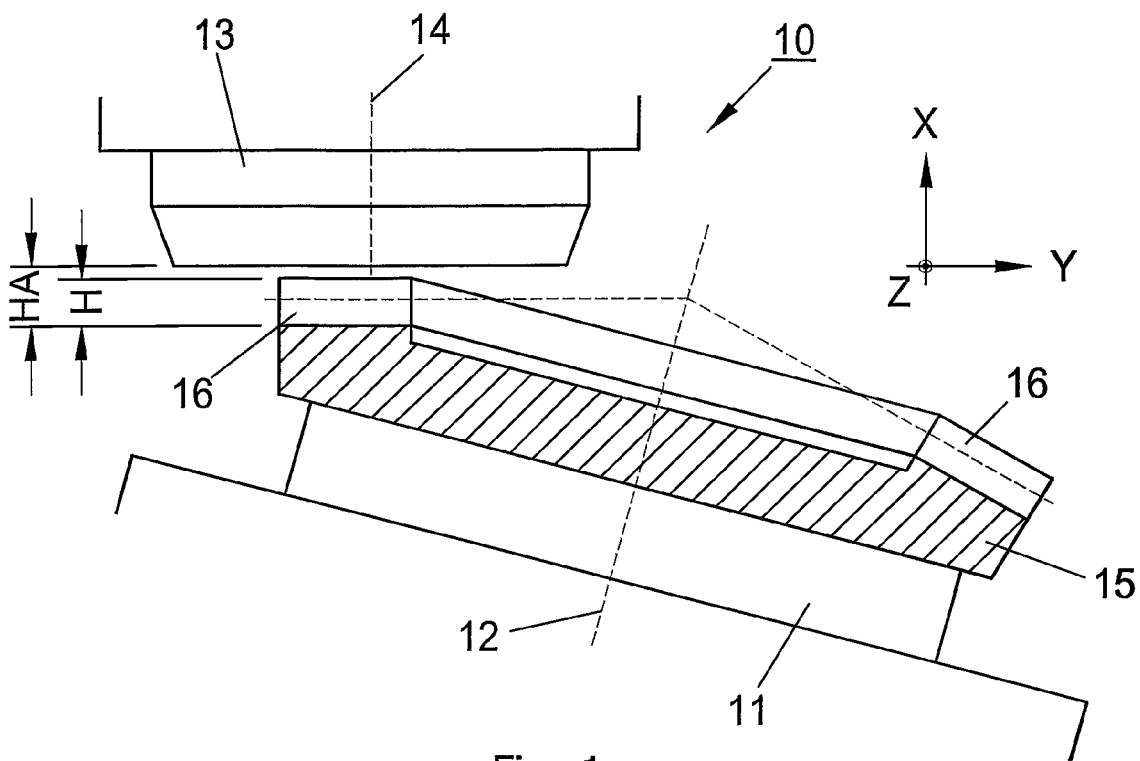
FIG. 1 is a schematic view of a portion of a conventional device.
Figure 2A:
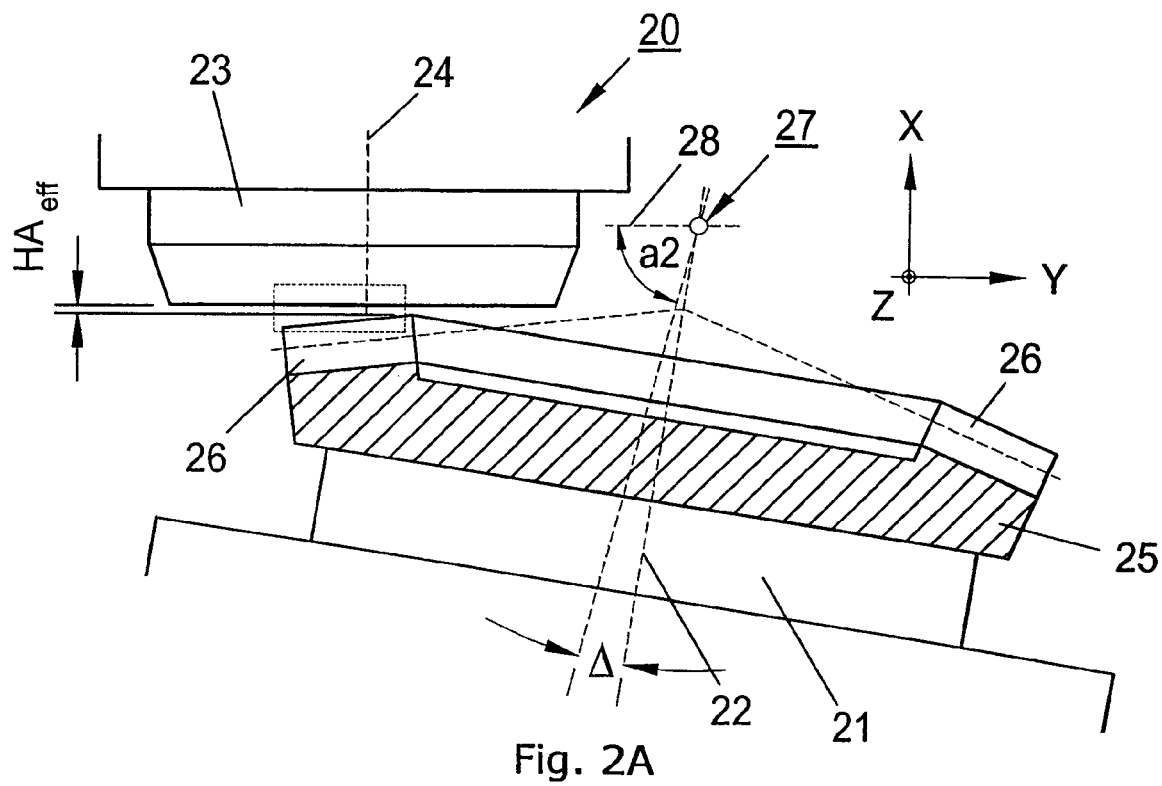
FIG. 2A is a schematic view of a portion of a device according to the invention in a first position.
Figure 2B:
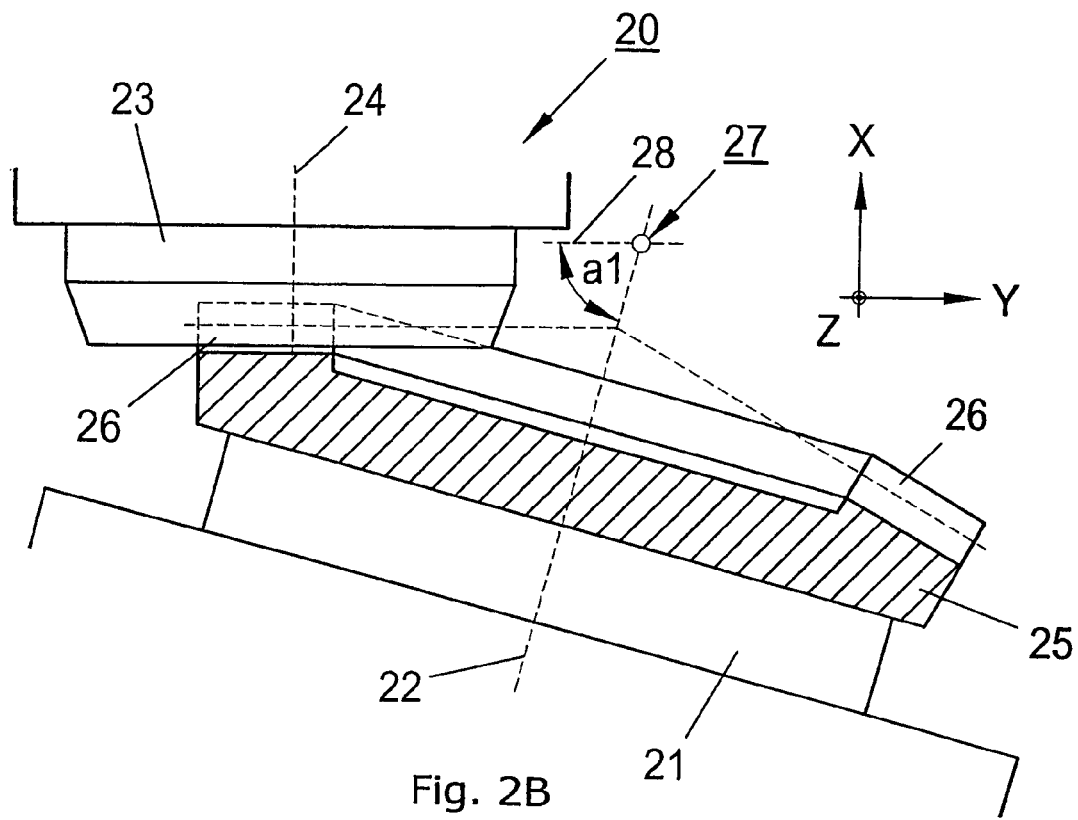
FIG. 2B is a schematic view of a portion of a device according to the invention in a second position.

A first device 20 according to the invention is shown in FIGS. 2A and 2B. The principle of the invention will be described with reference to these figures which have deliberately been designed for ease of comparison with the conventional approach shown in FIG. 1. There is shown a device 20 for what is known as plunge grinding. The device 20 comprises a workpiece spindle 21 for receiving a gear wheel 25. Also provided is a tool spindle (not shown) for receiving a tool 23. The tool spindle defines an axis 24 (A1-axis) about which the tool 23 rotates. There are provided a plurality of drives for machining the gear wheel in an indexing process. These drives are not shown in FIGS. 2A and 2B.

In accordance with the invention, a tooth gap in the gear wheel 25 is machined after an in-feed movement. This state, called the machining state, is shown in FIG. 2B. Then a relative movement takes place between tool 23 and workpiece 25 to remove the tool 23 from the tooth gap. In accordance with the invention, the relative movement is a tilting movement or a combined movement composed of a translatory movement and a tilting movement. Due to the relative movement, a relative change in angle between the tool 23 and the gear wheel 25 is achieved. In FIG. 2A, the angle a2 between a tool plane 28, extending parallel to the y-axis, and the axis of rotation 22 of the workpiece spindle is larger than the angle a1 in FIG. 2B. The change in angle is denoted by $\Delta$ and $a2=a1+\Delta$ applies. The relative change in angle occurs about a pivot point 27 (rotation about the C-axis). Due to this change in angle the size of the angle a1 which is set during the machining of a tooth gap between the tool plane 28 and the axis of rotation 22 of the workpiece spindle 21, increases. Due to the change in angle $\Delta$ an effective translational displacement $HA_{eff}$ of the tool 23 relative to the tooth 26 of the workpiece 25 results, as shown in FIG. 2A. In FIG. 2A, the position of the tooth 26 prior to the change in angle is indicated by a dotted line and the tooth is denoted in this position by 26'.

According to the prior art, there previously occurred in none of the machines a change in angle when removing the tool 13 from a tooth gap. Conventional machines are not configured to carry out such a movement from the point of view of the arrangement of the axes either. In the case of conventional machines 10, see FIG. 1, the tool 13 therefore has to perform a translatory withdrawal movement, corresponding to the tooth depth H plus a safety amount, to withdraw completely from the teeth. Only in this way is it possible to ensure, in the case of conventional machines 10, that a flank of the tooth 16 and the tool 13 do not collide during the subsequent indexing rotation about the axes 12.

In accordance with the invention, the change in angle $\Delta$ is abruptly carried out before the gear wheel 25 carries out an indexing rotation about the axis 22 and the tool 23 is advanced again. It is important that the corresponding tilting movement is coordinated with the indexing rotation. In the case of machines 20 comprising a mechanical drive, this coordination of the movements can be carried out using mechanical couplings. In the case of machines 20 equipped with a CNC control, the coupling is carried out "electronically", i.e. by appropriate mutual adaptation of the individual movement sequences.

It is important that the indexing rotation is carried out with time delay but in part simultaneously with the tilting movement. The fact that the two movements take place at least in part simultaneously allows a huge amount of time to be saved.

If the machine 20 is provided with a CNC control, the coupling takes place "electronically", i.e. by appropriate mutual adaptation of the individual movement sequences. The electronic coupling can be brought about by the control itself (for example, control 40 in FIG. 4) or by a specific software module (for example, software module 42 in FIG. 4).

In accordance with the invention, relatively high accelerations are required to be able to carry out the tilting movement so quickly that only a small amount of time elapses before the indexing rotation can be initiated. Machines 20 with a CNC control and direct drives are therefore particularly preferred, as the direct drives can convert a control command from the CNC control into the desired tilting movement quasi abruptly.

A control means according to the invention can be programmed in such a way that the gear wheel 25 and the tool 23 currently in use do not collide when the indexing rotation is carried out. Data about the dimensions of the gear wheel 25 and the tool 23 is taken into account when programming the control.

Particularly preferred is an embodiment in which the CNC control comprises a software module (for example, software module 42 in FIG. 4) which allows there to be carried out, in conjunction with the fitting to the device 20 of a gear wheel 25 to be machined and a tool 23, a so-called collision calculation to prevent a collision between teeth 26 and the tool 23. To carry out the collision calculation, the software module preferably takes over data already defined in the device 20 in conjunction with the machining of the gear wheel 25. On the basis of this data, it is then established three-dimensionally, taking account of the movement sequences, whether there is a risk of collision.

If the carrying-out of the collision calculation reveals that a collision may occur, the movement sequences are adapted accordingly. For example, the tilting movement carried out in accordance with the invention can be implemented with a more rapid ascent. Or the indexing rotation can start slightly later.

A CNC control according to the invention is programmed in such a way that the indexing rotation of the gear wheel and the movement (tilting movement or combined translatory movement and tilting movement) of the gear wheel 25 relative to the tool 23 take place in a coordinated manner. This means that the movement sequences are adapted to each other with respect to time. Thus, for example, the indexing rotation only starts delayed by a time $\Delta t$ once the tilting movement has been initiated.

Figure 3:
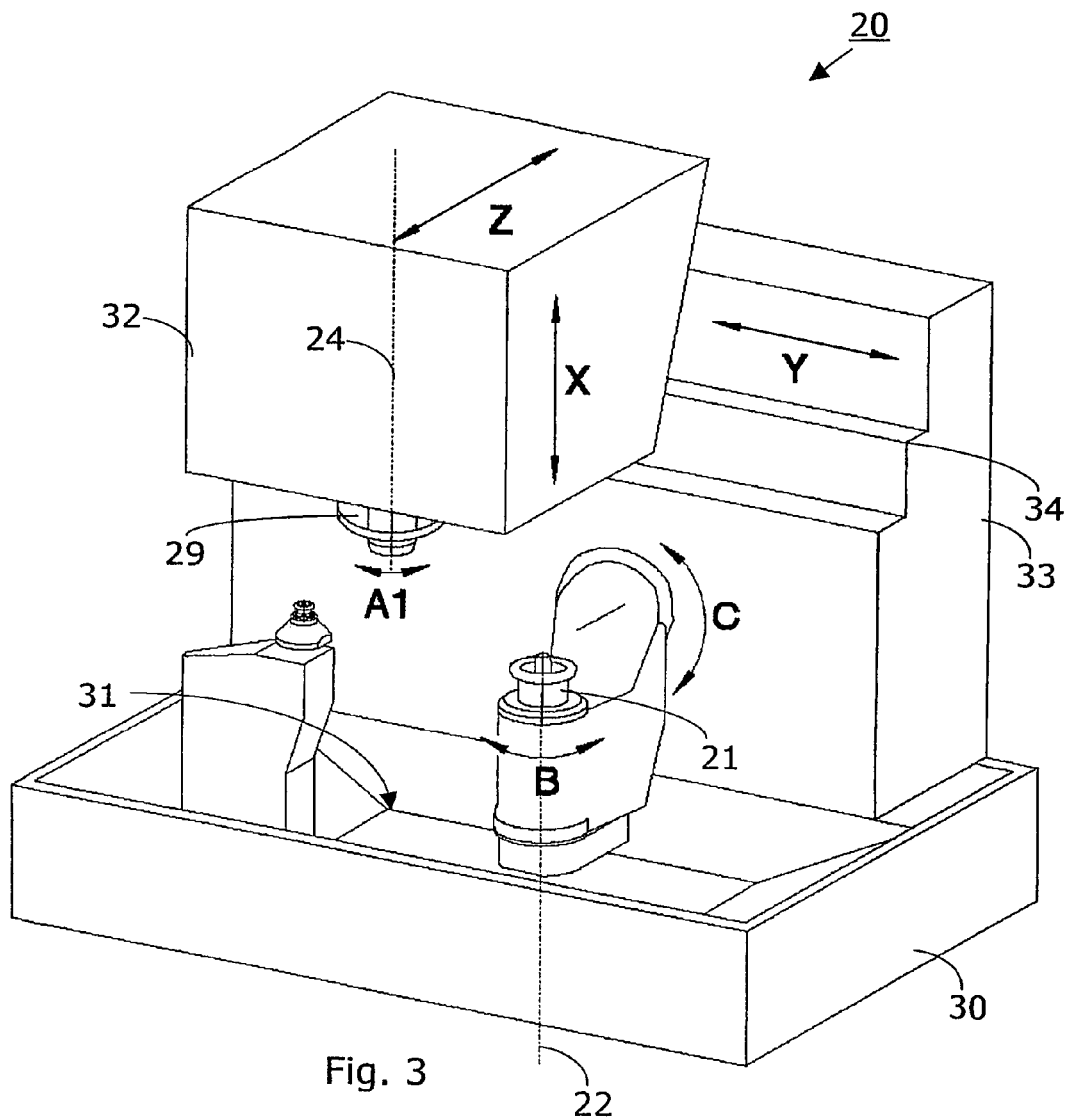
FIG. 3 is a perspective view of a device according to the invention.

A particularly preferred embodiment of the invention is illustrated in FIG. 3. A new type of device 20 with a workpiece spindle 21 for receiving a gear wheel and a tool spindle 29 for receiving a tool is shown. The device 20 comprises a plurality of drives for machining the gear wheel in an indexing process. The drives are concealed behind linings of the device 20. The device 20 further comprises a machine bed 30 with a region 31 for collecting chips. Provided on a stand 33, extending in the X-Y-plane, a carriage 32 is provided which is displaceable along horizontally extending rails 34 parallel to the Y-axis. The carriage 32 carries the tool spindle 29 and can carry out translatory movements in the X and Z-directions.

This type of arrangement shown in FIG. 3 differs from conventional machines. A basic difference to be highlighted is that the workpiece spindle 21 is rotatable about a C-axis. Unlike in conventional machines, a tilting movement of the workpiece relative to the tool can thus be carried out to separate the two with sufficient space from each other. Only after this spatial separation has been carried out, as described in conjunction with FIGS. 2A and 2B, is the tool incrementally rotated about the B axis. In the embodiment shown in FIG. 3, at least the C-axis to drive is a direct drive controlled by a CNC control. This direct drive allows instantaneous rotation of the workpiece.

In accordance with the invention, there is machined on the device 20 shown a tooth gap in a gear wheel fastened to the workpiece spindle 21. Then a relative movement between tool and workpiece is carried out to remove the tool from the tooth gap. For this purpose, one of the drives is activated via the CNC control in such a way that the relative movement includes a tilting movement about the C-axis which changes the relative angle between the tool and the gear wheel. The gear wheel then carries out an indexing rotation about the B-axis and the tool is advanced again to machine a further tooth gap. The described tilting movement is coordinated with the indexing rotation via the CNC control to prevent collisions.

Figure 4:
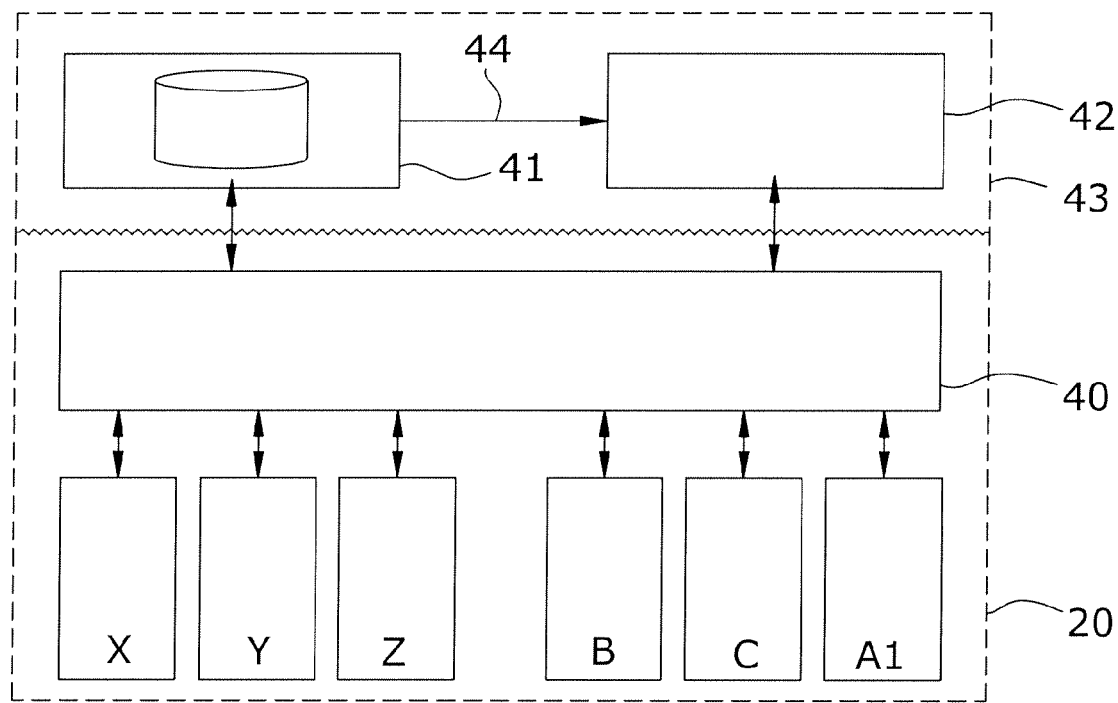
FIG. 4 is a schematic block diagram of a device according to the invention.

FIG. 4 shows the corresponding block diagram of a device 20 according to the invention. The device 20 has six drives X, Y, Z, B, C and A1 which are shown in FIG. 4 as functional units. Each of these drives is activated from a CNC control 40. In the example shown, the connections between the CNC control 40 and the drives are illustrated by double-headed arrows; this is intended to indicate that the drives can provide feedback to the control means 40. The rotary drives B, C, A1 can, for example, provide feedback concerning the torque, or angle encoders can be used to send the angular position to the control means 40. The drives X, Y, Z can, for example, send information back to the control means via displacement or position transmitters. In the embodiment shown, the control means 40 is connected to a software module 41. This software module 41 can, for example, allow access to a data memory. Stored information concerning the composition (shape, material, etc.) of a workpiece to be machined can be extracted from this data memory. Information concerning the tool used can also be stored in the data memory. A double-headed arrow between the control means 40 and the software module 41 indicates, in this case, that the control means is able to send information back to the software module 41.

In accordance with the invention, there can be provided a software module 42 which allows there to be carried out, in conjunction with the fitting to the device 20 of a gear wheel 25 to be machined and a tool 23, a so-called collision calculation to prevent a collision between teeth 26 and the tool 23. To carry out the collision calculation, the software module 42 preferably takes over already defined data from the software module 41, as indicated by the arrow 44. On the basis of this data, the software module 42 then establishes three-dimensionally, taking account of the movement sequences, whether there is a risk of collision. If there is a risk of collision, the software module 42 of the control means 40 can define other parameters for activating the drive C (tilting movement) and the drive B (indexing rotation).

It should be noted that the illustration shown in FIG. 4 is merely a block diagram representing a specific embodiment. There are also other approaches for integrating the principle of the invention into a CNC control, or for expanding a control means by software modules.

The functional units 41 and 42 can pertain to the scope of application software which is typically installed and run on an (external) computer which is connected to the control means 40 via a network connection. The control means 40 is typically implemented in a device 20.

The invention provides a method for machining a gear wheel using a device comprising a workpiece spindle 21 for receiving the gear wheel, a tool spindle 29 for receiving a tool and a plurality of drives for machining the gear wheel using the tool. This method includes the following steps:

machining a tooth gap in the gear wheel using the tool by carrying out a machining movement, carrying out a relative movement between the tool and the workpiece to remove the tool from the tooth gap, the relative movement being a tilting movement about the C-axis which changes the relative angle between the tool and the gear wheel, carrying out an indexing rotation about the B-axis to transfer the gear wheel into a different angular position, machining a further tooth gap of the gear wheel using the tool by carrying out once more a machining movement.

Figure 5:
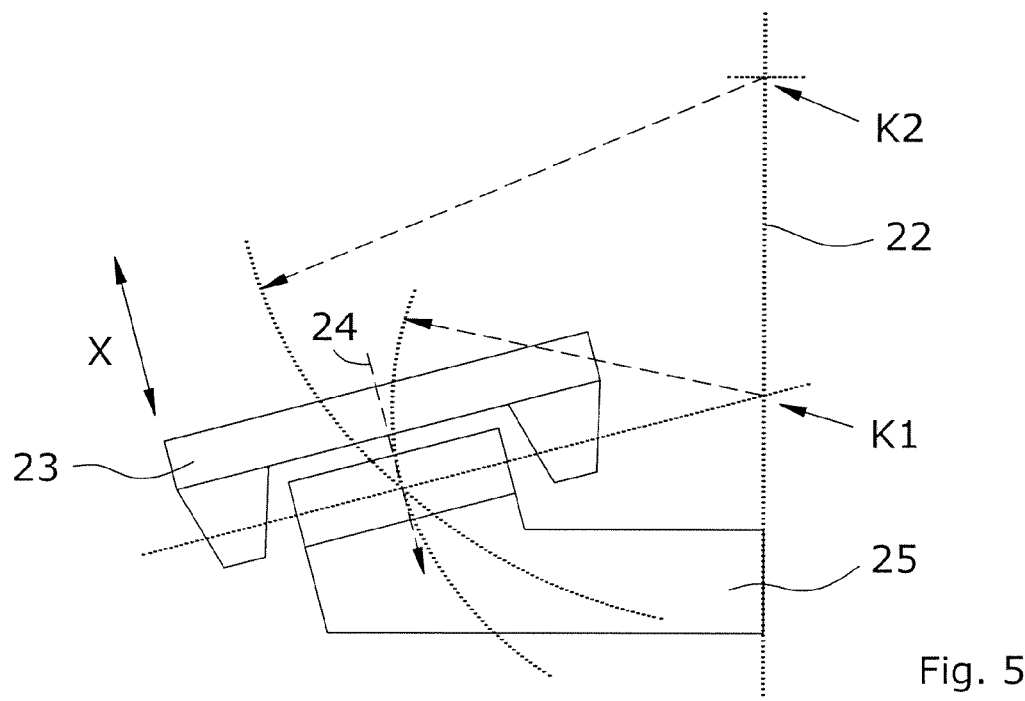
FIG. 5 is a schematic view of a portion of a further device according to the invention.

In an advantageous embodiment of the machine according to the invention shown schematically in FIG. 5, the pivot axis C is located at the point of the pitch cone apex K1 of the pitch cone of the workpiece 25, or in proximity to this point K1. This allows the majority of the tilting movement about the point K1 to point in the direction of the X-axis and thus assists the removal of the tool 23 from the tooth gap in the workpiece 25. If the pivot axis C were located at a point K2, the tool 23 would carry out a tilting movement about this point K2, as indicated in FIG. 5. In the event of a tilting movement about the point K2, the component of the tilting movement that points in the X-direction is smaller than in the aforementioned case, in which the pivot axis C is located at or in proximity to the point K1. Choosing the position of the pivot axis C appropriately provides, for the same tilting angle, a larger movement in the X-direction and a smaller movement in the Y-direction, as illustrated schematically in FIG. 5.

The invention can also be used with machines 20 comprising mechanical drives, although less time can be saved, as a mechanical drive allows only lower accelerations. A drawback of the application of the invention in a machine comprising a mechanical drive is the wear that can occur if the axles are accelerated too fast.

The invention can be used not only in plunged-cut grinding, as described, but also in milling or honing.

The invention is particularly suitable for the machining of bevel gear tooth systems or spur gear couplings in an immersion process.

The invention claimed is:

1. Method for machining a gear wheel (25) with a device (20) comprising a workpiece spindle (21) for receiving the gear wheel (25), a tool spindle (29) for receiving a tool (23) and plural drives (X, Y, Z, B, C, A1) for machining the gear wheel (25) using the tool (23), with the following steps:

machining a tooth gap in the gear wheel (25) using the tool (23) by carrying out a machining movement, carrying out a relative movement between the tool (23) and the gear wheel (25) to remove the tool (23) from the tooth gap, carrying out an indexing rotation to transfer the gear wheel (25) into a different angular position, machining a further tooth gap in the gear wheel (25) using the tool (23) by repeating a machining movement, characterized in that the relative movement is a tilting movement by means of which a relative change in angle between the tool (23) and the gear wheel (25) is achieved.

2. Method according to claim 1, characterized in that there is carried out, in addition to the tilting movement, a translatory relative movement which changes the relative distance between the tool (23) and the gear wheel (25).

3. Method according to claim 1, characterized in that the indexing rotation is carried out with time delay relative to, but in part simultaneously with, the relative movement.

4. Method according to claim 1, characterized in that the device or a computer executes a software module (42) in order to be able to carry out, in conjunction with the fitting to the device (20) of a gear wheel (25) to be machined and a tool (23), a collision calculation in order to prevent the tool (23) and the gear wheel (25) from colliding when the indexing rotation is carried out.

5. Method according to claim 1, characterized in that the tilting movement is carried out about a pivot axis (C) provided at a point (K1) located in the region of a pitch cone apex of the gear wheel (25) to be machined.

* * * * *